United States Patent Office 2,964,525
Patented Dec. 13, 1960

2,964,525

METHOD OF PRODUCING CHLOROCYANURIC ACIDS

William L. Robinson, Huntsville, Ala., assignor to Monsanto Chemical Company, St. Louis, Mo., a corporation of Delaware No Drawing. Filed Nov. 7, 1958, Ser. No. 772,423

9 Claims. (Cl. 260—248)

This invention relates to chlorocyanuric acids, particularly trichlorocyanuric acid or dichlorocyanuric acid, and to a novel process of producing same, and has particular reference to a novel process of preparing trichlorocyanuric acid or dichlorocyanuric acid which process was disclosed in my application for Letters Patent, filed in the United States Patent Office, July 8, 1957, Serial No. 670,391, which application is a continuation-in-part of my application, Serial No. 482,679, filed January 18, 1955, now abandoned, which is a continuation-in-part of my prior application, Serial No. 401,727, filed December 31, 1953, now abandoned. The disclosure contained in the present application should be taken in conjunction with said application for Letters Patent, Serial No. 670,391 and the other applications referred to above and considered as a continuation of said applications.

The novel process of preparing dichlorocyanuric acid of the present invention was also disclosed in part in my application for Letters Patent, filed in the United States Patent Office, April 25, 1957, Serial No. 655,020, which application is a division of said application Serial No. 482,679, now abandoned, which application is a continuation-in-part of said application Serial No. 401,727, now abandoned. The disclosure contained in the present application should also be taken in conjunction with said application for Letters Patent, Serial No. 655,020 and applications Serial No. 482,679 and Serial No. 401,727 and considered as a continuation of said applications.

An object of the invention is to provide an economical and commercially practical method of producing chlorocyanuric acids, and particularly trichlorocyanuric acid or dichlorocyanuric aid, in good yields.

A still further object of this invention is to provide a method of producing the above products in a single step without requiring extremely large excesses of chlorine.

Other objects and advantages will become apparent to those skilled in the art as the description of the invention proceeds.

A batch process for preparing trichlorocyanuric acid is described in U.S. Patent No. 2,607,738, to Edgar E. Hardy (assigned to Monsanto Chemical Company), issued August 19, 1952. According to this process trichlorocyanuric acid is prepared by dissolving cyanuric acid in the theoretical quantity of a 5% solution of caustic potash or soda and treating the resulting solution with chlorine until three atoms of the alkali have been substituted by chlorine. However, this process is not adapted for large scale commercial production since it results in low product yields and also a product low in available or active chlorine when relatively large quantities of reactants are used (see Journal of Chemical Society, 1902, 81, 200).

A continuous process for producing trichloriminocyanuric acid (also known as trichlorocyanuric acid) is described in British Patent No. 634,801. According to this process a stream of gaseous chlorine is passed over a flowing film of a solution of cyanuric acid in aqueous caustic alkali and the chlorine is simultaneously subjected to activation by light radiation. The product thus obtained is collected in a vessel in the form of a slurry, is discharged into another vessel and is eventually discharged into an earthenware filter and washed with water. The yield of chlorinated material is stated to be about 56% of the theoretical value. However, this process is subject to a number of disadvantages which also render it commercially unattractive. For example, it requires apparatus suitable for photochlorination, a prechlorination step in order to promote the formation of an evenly distributed film of sodium cyanurate, and at least 600% of the theoretical amount of chlorine in order to yield a product having a high available chlorine content. Moreover, this process results in low yields of trichlorocyanuric acid on the basis of the trisodium cyanurate employed and extremely low yields of such acid based on the amount of chlorine used.

I have developed a simple continuous process of producing trichlorocyanuric acid which process eliminates the disadvantages of the prior art processes discussed above. In accordance with my process chlorine and an aqueous solution of trisodium cyanurate are first introduced continuously into a reaction zone. The chlorine can be introduced into such zone as a liquid or gas, but is preferably present as a gas or in a partially gaseous state in such zone. The chlorine is continuously dispersed through the aqueous solution of the cyanurate, preferably by mechanical dispersing means such as continuous mechanical high shear mixing or agitation, to maintain the solution at a pH below 4.5. If the chlorine is not dispersed sufficiently through the aqueous solution of the cyanurate to provide a pH below 4.5, the yield of the trichlorocyanuric acid, based on the cyanurate employed, is generally below 70% which is too low for commercial production. Preferably, the chlorine should be sufficiently dispersed through the solution to maintain the solution below a pH of 4.3 since yields of 85% and higher of trichlorocyanuric acid are readily obtained under such conditions. The pH may be as low as 2.5 without appreciable effect on the yield.

During the admixture of the chlorine and the cyanurate solution, the resulting solution or mixture is continuously maintained at a temperature of about 0–45° C., preferably about 10–25° C. The temperature used may be below 0° C., but there is no advantage and there is a danger of the solution freezing at temperatures of —8 to —9° C. Although temperatures of 25 to 45° C. can be used, some loss of yield is experienced at temperatures above 35° C., and in most instances it is desirable to continuously maintain the reaction mixture at a temperature between about 10 and about 35° C. for optimum yields. Temperatures appreciably above 45° C. should be avoided due to excessive yield losses and decomposition of the triazine ring of the cyanurate. Under the desirable conditions of temperature and pH referred to above the reaction is complete within a relatively short time, usually less than 6 minutes. There is thus formed an aqueous reaction mixture having a pH below 4.5, preferably below 4.3, which comprises a slurry of trichlorocyanuric acid, which is substantially insoluble in the aqueous medium, the solubility being less than 1.5% by weight in an aqueous solution of sodium chloride. At lower temperatures, that is, between about —5° C. and 9° C., chlorine octahydrate is also formed and is present in the aqueous reaction mixture primarily as a dispersed solid since it is relatively insoluble in the reaction mixture, but at temperatures between about 10 and 25° C., or at higher temperatures say up to 45° C., very little, if any, of this product is formed.

The trichlorocyanuric acid formed in the aqueous reaction mixture in the reaction zone is continuously removed from the reaction zone together with a portion of the aqueous medium, preferably so as to maintain the volume of the aqueous reaction mixture in the reaction zone substantially constant, before appreciable or material decomposition or hydrolysis of the trichlorocyanuric acid occurs. In any event the trichlorocyanuric acid should be removed from the reaction zone before the yield thereof, based on the trisodium cyanurate used, drops below 75%, preferably before the yield drops below 85%. The sojourn time of an increment of trisodium cyanurate and an increment of gaseous chlorine in the reaction zone required to produce an increment of trichlorocyanuric acid is usually less than 10 minutes, and is preferably less than 6 minutes.

The trichlorocyanuric acid is next separated from the bulk of the aqueous medium with which it is associated in the reaction mixture, by filtration, decantation, centrifugation or the like before appreciable or material decomposition or hydrolysis of the trichlorocyanuric acid occurs until the trichlorocyanuric acid contains less than 40%, preferably below 25%, on its own dry weight, of water. The wet product is preferably washed with water to remove the sodium salt therein and is then dried to form a dry, solid product containing from 0 to 4%, preferably below 1.5%, by weight of moisture without danger of decomposition or hydrolysis. When the reaction of chlorine and cyanurate is carried out at temperatures of about 40 to 45° C., appreciable amounts of the trichlorocyanuric acid remain in solution after the undissolved trichlorocyanuric acid is removed from the reaction mixture. In order to obtain increased yields of the trichlorocyanuric acid under these conditions, it is necessary to cool the resulting solution to a temperature below 30° C., preferably between about 10 and 30° C., while dispersing sufficient chlorine therein to obtain a pH below 4.3, after which additional trichlorocyanuric acid is formed as solid particles and these are removed in the manner previously described above.

For a more complete understanding of the present invention, reference is made to the following illustrative examples.

Example I

One hundred and six grams of sodium hydroxide was dissolved in 1400 grams of water and the resulting product mixed with 100 grams of cyanuric acid to form an aqueous solution of sodium cyanurate. This solution was introduced into a reactor equipped with an agitator, a thermometer, an off-gas tube and a chlorine inlet tube and chlorinated for about 34 minutes at a temperature within the range of about minus 1.5° C. to about plus 5° C. In this run about 176 grams of chlorine was used.

The products of this reaction included trichlorocyanuric acid, aqueous solution of sodium chloride and chlorine octahydrate. The aqueous solution of sodium chloride was separated from the other reaction products by filtration, and the octahydrate was removed from the product by washing with water. After drying, the product was analyzed and found to contain an available chlorine content of only 63.2%.

In like manner, additional attempts were made to produce trichlorocyanuric acid by the batch process with the following results:

| | Grams of Sodium Cyanurate | Grams of Chlorine | Theoretical Chlorine in TCCA[1] | Grams of TCCA[1] | Percent Yield of TCCA[1] | Percent Available in Cl₂ in Product |
|---|---|---|---|---|---|---|
| 1 | 151 | 123 | 45.8 | 10 | 5.6 | |
| 2 | 151 | 136 | 45.8 | 18 | 10 | |
| 3 | 151 | 148 | 45.8 | (²) | | |
| 4 | 151 | 176 | 45.8 | 111 | 61.7 | 63.2 |
| 5 | 151 | 149 | 45.8 | 31 | 17.2 | 72.4 |
| 6 | 290 | 211 | 45.8 | 155 | 57.0 | 57.2 |

[1] Trichlorocyanuric acid.
[2] Discarded.

It is evident from Example I and the above-listed experimental data that attempts to obtain complete chlorination of a fairly large quantity of trisodium cyanurate in an aqueous medium by a batch operation to produce trichlorocyanuric acid results in the formation of products containing less than 62% of theory of trichlorocyanuric acid. Moreover, since trichlorocyanuric acid has an available chlorine content of at least 85%, it is evident that the products produced by the batch operation of Example I have an available chlorine content which is materially lower than that of trichlorocyanuric acid, which indicates that considerable decomposition occurs which results in the formation of products of low available chlorine content.

Example II

An aqueous solution of sodium cyanurate was prepared by mixing together cyanuric acid, water and sodium hydroxide in the proportions of about 100, 1400 and 100 parts by weight, respectively. This solution was cooled continuously in a cooling coil to a temperature of about 2° C. and introduced over a period of approximately 7½ hours and at a rate of about 0.530 lb. of sodium cyanurate per hour into a reactor equipped with an efficient agitator and an ice bath for controlling the reaction temperature. Simultaneously with the introduction of the sodium cyanurate solution, chlorine was charged continuously at a rate always insuring a small excess of chlorine in the reaction mixture and was continuously mechanically dispersed through the cyanurate solution to maintain the pH below 4.5. Throughout the ensuing reaction, the temperature of the reaction mixture was maintained within the limits of about 7° C. to about 9° C. The products of this reaction included trichlorocyanuric acid, an aqueous solution of sodium chloride and chlorine octahydrate. These products were removed periodically by means of a suction pump from the reactor into a suitable receiver so that the sojourn time of the trichlorocyanuric acid in the reactor was about 6 minutes. Under these conditions no appreciable decomposition of the trichlorocyanuric acid occurred.

The aqueous solution of sodium chloride was separated from the remainder of the reaction products by filtration, and the octahydrate was removed from the trichlorocyanuric acid by washing with ice water.

The purified trichlorocyanuric acid was air-dried overnight, heated for 2 hours in an oven at 105° C., then ground to a finely divided state and finally reheated at 105° C. for 2 to 3 hours. The trichlorocyanuric acid thus obtained had an available chlorine content of 87.60% and was obtained in a yield amounting to 77.2% of theory.

It is evident from Example II that the method of the instant invention produces results which are novel and completely unexpected since there is no reason, theoretically or factually, why it should produce trichlorocyanuric acid in higher yields and/or with a higher available chlorine content than is obtainable by the batch process of Example I.

Example III

An aqueous solution of trisodium cyanurate was prepared by adding 29.25 parts (lbs.) of an aqueous 50% NaOH solution with stirring to a slurry of 15 parts (lbs.) of cyanuric acid in 172.5 parts (lbs.) of water until the trisodium cyanurate was formed. The amount of NaOH employed was 0.14 mol in excess of that required to form trisodium cyanurate and the pH of the cyanurate solution was about 13.5. The resulting solution was filtered and cooled to a temperature of 10° C. Approximately 4 parts (lbs.) of this solution was charged to a chlorination vessel which comprised a jacketed, cylindrical glass container having an internal diameter of 5 inches and internal height of 13 inches, which container was provided with three (3) equidistantly spaced vertical baffles of 1 inch width spaced radially inward 1 inch from the inside wall of the container. The capacity of the container was about 8 parts (lbs.) of solution. Agitation was provided by a shaft mounted coincident with the vertical axis of the container and provided with a six bladed turbine propeller of 2 inch diameter spaced 2 inches above the inside of the bottom of the container and a second six bladed turbine propeller of 2 inch diameter spaced 5 inches above the first mentioned propeller. The shaft and propellers were rotated at 2300 revolutions per minute or a propeller tip speed of 1200 feet per minute. The container was also provided with a tube for introducing gaseous chlorine into the bottom of the container beneath the lowest propeller and was also provided with a tube for introducing aqueous trisodium cyanurate into the bottom of the container beneath the lowest propeller. The container was also provided with a tube extending vertically downward into the container a distance 10 inches from the bottom of the container for removal of the reaction products.

Gaseous chlorine was continuously introduced into the 4 parts (lbs.) of the aqueous trisodium cyanurate solution in the container over a four minute period at such a rate that the temperature of the aqueous medium was maintained at about 18–20° C. when brine at a temperature of −25° C. was circulated through the jacket of the container. During this period of time the chlorine was continuously dispersed through the solution by the agitator propellers and baffles. At the end of this period of time an aqueous heel comprising a slurry of trichlorocyanuric acid in an aqueous solution of sodium chloride, trisodium cyanurate and chlorine had formed, the heel having a pH of 3.8–3.9.

The remainder of the trisodium cyanurate solution, as prepared in the first paragraph of this example, was cooled to a temperature of 1.5° C. and maintained at this temperature, and this solution was then introduced continuously into the aqueous heel in the container at a rate of 2.41 parts (lbs.) per minute with agitation at the speed described above, and concurrently gaseous chlorine was introduced continuously into the aqueous heel in an amount of 3.5% in excess of the $Cl_2$ theoretically required to react with the trisodium cyanurate into the container. The continuous agitation of the solution continuously dispersed the gaseous chlorine through the aqueous heel so that the pH was maintained at 3.8–3.9. The temperature of the aqueous heel in the container was maintained at 18–20° C. by circulating coolant through the jacket of the container. When the contents of the container rose to the level of the liquid removal tube mentioned above, the level of the aqueous heel in the container was maintainer constant by continually pumping a portion of the aqueous heel from the vessel containing trichlorocyanuric acid through the removal tube. The portion of aqueous heel thus removed was continuously supplied to a centrifuge where the trichlorocyanuric acid was removed in the form of a centrifuge cake, while the bulk of the aqueous liquid containing sodium chloride and some chlorine was discarded. The centrifuge cake consisted of trichlorocyanuric acid and about 1% of sodium chloride and less than 15% water based on the dry weight of the trichlorocyanuric acid. There was no evidence that chlorine octahydrate was formed during the reaction. When the centrifuge cake had built up to the capacity of the centrifuge, the supply of aqueous heel to the centrifuge was diverted to a second centrifuge, and the centrifuge cake was then centrifuged until it contained 5 to 6% by weight of moisture. The centrifuge cake was then removed from the centrifuge, washed with water to remove the major portion of sodium chloride therein and dried in an oven at 105° C. The yield of trichlorocyanuric acid was 94% based on the trisodium cyanurate employed, and this product contained in excess of 85% of available chlorine.

The sojourn time of the chlorine and aqueous solution of trisodium cyanurate supplied to the chlorination vessel varied between about 3 and 4 minutes. In this manner and the subsequent removal of the trichlorocyanuric acid from the major part of the aqueous phase, any material decomposition of the trichlorocyanuric acid was avoided.

The continuous process was carried out for 26 minutes without any difficulties in operation or without decreased yield of trichlorocyanuric acid, but it is to be understood that the process is operable continuously over long periods of time.

*Example IV*

An aqueous solution of trisodium cyanurate was prepared by dissolving, with stirring, 100 parts (lbs.) of cyanuric acid in 1150 parts (lbs.) of water to which had been added 195 parts (lbs.) of 50% NaOH. The resulting solution had a pH of 13.5. The solution was filtered and 25 parts (lbs.) were charged to a jacketed chlorination vessel similar to that described in the first paragraph of Example III, with the exception that the vessel was constructed of type 316 stainless steel, having an internal diameter of 10 inches, an internal height of 25 inches and an actual working capacity of 60 lbs., and provided with two six-bladed turbine propellers each 4 inches in diameter, the product therein being drawn off through a tube having an opening about 18 inches above the bottom of the vessel. Type 316 stainless steel was used throughout. The 25 parts (lbs.) of solution was cooled to a temperature of 10° C. by circulating brine at a temperature of −25° C. through the jacket of the vessel.

The solution in the vessel was chlorinated by passing gaseous chlorine through a tube in the bottom of the vessel into the solution at a point just below the bottom agitator propeller with the propeller operating at 1050 r.p.m. equivalent to a tip speed of 1180 feet per minute, the chlorine being supplied at a rate sufficient to maintain the temperature of the solution at 18–21° C. with brine at −25° C. circulating through the cooling jacket. The introduction of chlorine and the mechanical dispersion thereof through the solution was continued until the pH of the solution was about 4.0. The resulting product was an aqueous slurry comprising trichlorocyanuric acid slurried in an aqueous solution of sodium chloride, chlorine and trisodium cyanurate.

The remainder of the trisodium cyanurate solution (1420 parts) was cooled to a temperature of 5° C. and metered into the slurry in the chlorinating vessel through a tube opening into the lower part of the vessel below the lowest turbine propeller, at a rate of 11 parts (lbs.) per minute with continuous agitation at the propeller speed described above, and gaseous chlorine was concurrently continuously introduced into the slurry at the rate of 1.4 parts per minute (corresponding approximately to a 7% excess chlorine on the basis of trisodium cyanurate, calculated as NaOH). Under the conditions of agitation and dispersion of the chlorine through the slurry, the pH of the slurry was maintained at about 4.0. The temperature of the slurry was maintained at about 18–20° C. by passing cooling brine at −25° C. through the jacket of the vessel.

A portion of the slurry in the vessel was continuously pumped from the vessel through the withdrawal tube referred to above at the rate of about 12.4 parts (lbs.) thus maintaining a substantially constant volume of heel slurry in the vessel consisting of a weight of slurry of about 60 parts (lbs.). The slurry removed from the vessel was continuously dewatered in a centrifuge to a water content of less than 25% by weight, based on the dry centrifuge cake. When the centrifuge cake had built up to the capacity of the centrifuge, the slurry removed from the vessel was diverted to another centrifuge and the cake in the first centrifuge was dewatered until it contained about 6 to 7% by weight of moisture. The cake which consisted essentially of trichlorocyanuric acid and water was washed with water to remove sodium chloride and then dried in an oven for 2.5 to 3 hours at 90–100° C. The yield of trichlorocyanuric acid was 90% based on the trisodium cyanurate used, and the product contained in excess of 85% available chlorine.

The sojourn time of the chlorine and trisodium cyanurate solution in the chlorination vessel varied between about 4 and 5 minutes. Because of this, ease of heat removal and the subsequent separation of the trichlorocyanuric acid from the bulk of the water in the aqueous slurry formed, material decomposition of the trichlorocyanuric acid was avoided as is shown by the high yield obtained.

The continuous process was carried out for 90 minutes without any difficulties in operation or without decreased yields of trichlorocyanuric acid, but it is to be understood that the process is operable continuously over much longer periods of time.

*Example V*

About 1500 parts by weight of an aqueous slurry of dipotassium cyanurate analyzing 7.5% cyanuric acid and 6.5% KOH (2:1 molar ratio of KOH to cyanuric acid) and having a pH above 13 was prepared. Twenty-five parts of this slurry were charged to a jacketed chlorination vessel identical with that described in the first paragraph of Example III. This slurry was maintained at a temperature of 10° C. by circulating brine at a temperature of −25° C. through the jacket of the vessel.

The slurry in the vessel was then chlorinated by passing gaseous chlorine through a tube in the bottom of the vessel into the slurry at a point just below the bottom agitator propeller with the propeller operating at 1050 r.p.m., equivalent to a peripheral speed of 1180 feet per minute, the chlorine being supplied at a rate sufficient to maintain the temperature of the slurry at substantially 25° C. with brine at −25° C. circulating through the cooling jacket. The introduction of chlorine and the mechanical dispersion thereof through the slurry was continued until the pH of the slurry was between 3 and 4. The resulting product was an aqueous slurry comprising dichlorocyanuric acid in an aqueous medium containing potassium chloride, chlorine and small amounts of dipotassium cyanurate.

The remainder of the dipotassium cyanurate slurry (1475 parts) was cooled to 10° C. and metered into the above described slurry of dichlorocyanuric acid in the chlorinating vessel through a tube opening into the lower part of the vessel below the lowest turbine propeller at the rate of 11 parts per minute with continuous agitation at the propeller speed described above, and gaseous chlorine was concurrently continuously introduced into the slurry at the rate of 0.97 part per minute (corresponding approximately to a 7% molar excess of chlorine over the stoichiometric amount necessary to react with the dipotassium cyanurate thus introduced). Under the conditions of agitation and dispersion of the chlorine through the slurry, the pH of the slurry was maintained between 3 and 4. The temperature of the slurry in the vessel was maintained at substantially 25° C. by passing cooling brine at −25° C. through the jacket of the vessel.

A portion of the slurry in the vessel was continuously pumped from the vessel through the withdrawal tube at the rate of about 12 parts per minute, thus maintaining a substantially constant volume of heel slurry in the vessel consisting of a weight of slurry of about 60 parts.

The slurry removed from the vessel was continuously dewatered in a centrifuge to a water content of less than 40% by weight based on the dry centrifuge cake. When the cake had built up to the capacity of the centrifuge, the slurry removed from the vessel was diverted to another centrifuge and the cake in the first centrifuge was dewatered until it contained about 25% by weight of moisture. The cake which consisted essentially of dichlorocyanuric acid and water was washed with water to remove potassium chloride and then dried in an oven for 2.5 to 3 hours at 90 to 100° C. The yield of dichlorocyanuric acid was above 80% based on the dipotassium cyanurate used, and the product contained 71.2% of available chlorine.

The sojourn time of the chlorine and dipotassium cyanurate in the chlorination vessel varied between 4 and 5 minutes. Because of this short sojourn time, ease of heat removal and subsequent separation of the dichlorocyanuric acid from the bulk of water in the aqueous slurry, material decomposition of the dichlorocyanuric acid was avoided as is shown by the high yield obtained.

The continuous process was carried out for 90 minutes without any difficulties in operation or without decreased yields of dichlorocyanuric acid, but it is understood that the process is operable continuously over much longer periods of time.

*Example VI*

The procedure described in Example V was repeated, the rates of addition of dipotassium cyanurate to the heel of slurry, the rate of withdrawal of slurry and the rate of introduction of chlorine being adjusted so as to maintain the slurry temperature at 20° C., 30° C. and 44.5° C., respectively. The product was isolated and dried in the same manner, in each of these experiments, and the yields of dichlorocyanuric acid obtained were above 80%, above 75% and above 75%, respectively, of theory, based on the dipotassium cyanurate used. The dichlorocyanuric acid obtained in these experiments contained between 70.7 and 71.5% of available chlorine.

In carrying out the reaction between the cyanurate and chlorine, the reactants may be employed in substantially stoichiometric proportions, but it is desirable to use at least a slight excess of chlorine. More particularly, it is preferred to use from 5% to 20% molar excess of chlorine and within these limits approximately a 10% to 15% molar excess of chlorine is preferred. However, it is possible to use fairly large excesses of chlorine although no benefit is derived thereby, and the use of large excesses becomes uneconomical or requires chlorine recovery systems and often results in foaming of the reaction mixture. Accordingly, it is desirable to avoid the use of chlorine substantially more than a 100% molar excess of that required to react stoichiometrically with the cyanurate.

The trisodium cyanurate or dipotassium cyanurate can be employed in the practice of this invention. The pH of aqueous solutions or dispersions of these cyanurates is usually above 12.0, and generally between 13.1 and 13.6. Such solutions or dispersions are preferably employed at a temperature of −5° C. to 10° C. to facilitate temperature control in the reaction zone. The trisodium cyanurate and mixtures containing as low as about 2.2 sodium atoms per mol of cyanuric acid are ordinarily soluble in water at concentrations below 10% by weight. At higher concentrations, for example, up to 15% by weight, usually a slight excess of alkali is necessary to obtain a complete solution. At higher concentrations these cyanurates are not completely soluble in water and form dispersions or slurries which can be chlorinated up to the point where they become so thick that the chlorine cannot be sufficiently dispersed therein to obtain the necessary low pH values as hereinbefore defined. In the case of dipotassium cyanurate, that is, a cyanurate having two potassium atoms, plus or minus 0.2 atom, per mol of cyanuric acid, this cyanurate normally is not completely soluble in water except at impractically low concentrations of 3% by weight or less, and at the normal concentrations of about 6 to 10% by weight employed for chlorination is present in water in the form of an aqueous slurry or dispersion. However, these dispersions or slurries are readily chlorinated in accordance with the processes of this invention provided they are sufficiently fluid so that the chlorine can be dispersed therein to obtain the proper pH values in the reaction mixture as described herein. The term "solutions" as used herein is intended to designate true or complete solutions as well as the dispersion or slurries referred to above.

The chlorination of the aforementioned cyanurates is carried out en masse, that is, by introducing chlorine into a mass of an aqueous solution or dispersion of said cyanurate under conditions insuring vigorous agitation and intimate and uniform contacting of the reactants, as distinguished from passing gaseous chlorine into a reaction zone in contact with a thin film of the above solution. More specifically, the chlorination of the said cyanurates is effected preferably in a heel of an aqueous medium, that is, by introducing chlorine, with additional mechanical agitation, into a heel of an aqueous medium which initially may be water or the aqueous reaction product of a previous run including trichlorocyanuric acid and an aqueous solution of sodium or potassium chloride depending on whether trisodium cyanurate or dipotassium cyanurate is employed.

The preceding description relates primarily to the production of trichlorocyanuric acid from trisodium cyanurate, but it is to be understood that the present invention also includes the production of dichlorocyanuric acid from dipotassium cyanurate. The procedures and processes hereinbefore described with regard to the production of trichlorocyanuric acid are equally applicable to the production of dichlorocyanuric acid. However, there is one important distinction, and there is one optional variation in regard to temperature of chlorination, in the production of dichlorocyanuric acid. In the chlorination of dipotassium cyanurate with chlorine, no appreciable amounts of dichlorocyanuric acid are formed unless the chlorine is dispersed through the aqueous solution or dispersion of dipotassium cyanurate to maintain the pH of the solution at about 4.5 or lower. By effecting dispersion of the chlorine so as to provide a pH of about 2.0 to 2.5, it is possible to obtain yields of dichlorocyanuric acid which are 5 to 10% higher than at a pH of 2.9 to 3.0. However, practical commercial yields, above 75%, are obtained in the pH range of between about 2.0 and 4.1. No noticeable benefits are obtained at a ph below 2.0. On the other hand in the case of trichlorocyanuric acid production, some trichyorocyanuric acid is formed from trisodium cyanurate, althrough in low, impractical yields, at a pH above 4.5, but a marked increase in yield takes place when chlorine is dispersed through the solution of cyanurate to maintain the pH below 4.3 and preferably between 3.0 and 4.2, and more desirably between 3.0 and 3.8.

In the chlorination of dipotassium cyanurate, it is also possible to operate at somewhat higher temperatures without decomposition of the triazine ring than is the case with trichlorocyanuric acid. Thus, temperatures as high as 50° C. can be used. However, in cases where the temperature during chlorination is between about 45 and 50° C., it is necessary in order to obtain practical yields to separate the solid dichlorocyanuric acid from the aqueous phase, cool the aqueous phase to a temperature of about 10 to 30° C. while dispersing therein sufficient chlorine to maintain the pH below 3.0 and then remove the solid dichlorocyanuric acid, which has formed, by centrifugation, filtration or the like.

The chlorocyanuric acids of the instant invention find use as the active constituents of compositions having oxidizing, bleaching, detergent and disinfecting properties. They are also useful as lachrymators and as halogenating agents.

What is claimed is:

1. A continuous process of preparing dichlorocyanuric acid which comprises continuously introducing an aqueous solution or dispersion of dipotassium cyanurate into a reaction zone which is maintained at a temperature within the range of just above the freezing point of said solution or dispersion up to 50° C., continuously introducing chlorine into said solution or dispersion in said reaction zone in an amount at least equal to the stoichiometric amount necessary to replace the potassium atoms of said cyanurate with chlorine atoms, continuously dispersing said chlorine through said solution or dispersion to maintain said solution or dispersion at a pH of not more than 4.5, thereby forming an aqueous reaction mixture having a pH of not more than 4.5 comprising a slurry of dichlorocyanuric acid, continuously removing a portion of said reaction mixture from said reaction zone before material decomposition of the dichlorocyanuric acid occurs in said reaction mixture, and separating the dichlorocyanuric acid from the bulk of the aqueous phase of the reaction mixture thus removed before material decomposition of the dichlorocyanuric acid occurs.

2. A continuous process for preparing dichlorocyanuric acid which comprises continuously introducing an aqueous solution of dipotassium cyanurate into a reaction zone which is maintained at a temperature within the range of just above the freezing point of the solution up to 25° C., continuously introducing gaseous chlorine into said solution in said reaction zone in an amount varying from the stoichiometric amount necessary to replace the potassium atoms of said cyanurate with chlorine atoms up to a 20% molar excess of chlorine, continuously dispersing said chlorine through said solution to maintain the solution at a pH of not more than 4.5, thereby forming an aqueous reaction mixture having a pH of not more than 4.5 comprising a slurry of dichlorocyanuric acid, continuously removing a portion of said reaction mixture from said reaction zone before material decomposition of dichlorocyanuric acid occurs in said reaction mixture, and separating the dichlorocyanuric acid from the bulk of the aqueous phase of the reaction mixture thus removed before material decomposition of the dichlorocyanuric acid occurs.

3. A continuous process for preparing dichlorocyanuric acid which comprises continuously and simultaneously introducing (1) an aqueous solution of dipotassium cyanurate containing between 0.2 potassium atom less than and 0.2 potassium atom more than the two potassium atoms in dipotassium cyanurate and (2) chlorine in an amount at least equal to a slight excess but not substantially more than a 100% molar excess of the stoichiometric amount necessary to replace the potassium atoms of said cyanurate which chlorine atoms, into a reaction zone to form a reaction mixture which is maintained at a temperature of about 10 to 35° C., said solution and chlorine being supplied at such a rate and with sufficient mechanical agitation to maintain the resulting reaction mixture at a pH between about 2.0 and 4.1, thereby continuously forming an aqueous reaction mixture having the aforesaid pH and comprising a slurry of dichlorocyanuric acid, continuously removing from said reaction zone a portion of said dichlorocyanuric acid together with a portion of the aqueous phase of said reaction mixture at a rate sufficient to maintain the volume of aqueous reaction mixture in the reaction zone substantially constant, and subsequently dewatering the dichlorocyanuric acid thus removed from said reaction zone before material decomposition of said acid occurs.

4. A continuous process of preparing dichlorocyanuric acid which comprises continuously introducing an aqueous solution of dipotassium cyanurate into a reaction zone, continuously introducing chlorine into said solution in said reaction zone in an amount varying from a slight excess of the stoichiometric amount required to produce dichlorocyanuric acid up to a 100% molar excess of chlorine to form a reaction mixture which is maintained by cooling at a temperature of about 10 to 45° C., said solution and chlorine being supplied at such a rate and being provided with sufficient mechanical agitation to maintain said reaction mixture at a pH between about 2.0 and 4.1, thereby continuously forming an aqueous reaction mixture having the aforesaid pH and comprising a slurry of dichlorocyanuric acid, continuously removing a portion of dichlorocyanuric acid and a portion of the aqueous phase of said reaction mixture from the reaction zone and separating the dichlorocyanuric acid thus removed from the aqueous phase associated therewith until the dichlorocyanuric acid contains less than 40% by weight of moisture and before the yield of dichlorocyanuric acid, based on the dipotassium cyanurate employed, drops below 75% of theory.

5. A continuous process of preparing trichlorocyanuric acid which comprises continuously introducing an aqueous solution of trisodium cyanurate into a reaction zone which is maintained at a temperature within the range of just above the freezing point of the solution up to 50° C., continuously introducing chlorine into said solution in said reaction zone in an amount at least equal to the stoichiometric amount necessary to replace the sodium atoms of said cyanurate with chlorine atoms, continuously dispersing said chlorine through said solution to maintain the solution at a pH below 4.5, thereby continuously forming an aqueous reaction mixture having a pH below 4.5 consisting essentially of sodium chloride and a slurry of trichlorocyanuric acid, continuously removing a portion of said reaction mixture from said reaction zone before material decomposition of the trichlorocyanuric acid occurs in said reaction mixture, and separating the trichlorocyanuric acid from the bulk of the aqueous phase of the reaction mixture thus removed before material decomposition of the trichlorocyanuric acid occurs.

6. A continuous process of preparing trichlorocyanuric acid which comprises contnuously and simultaneously introducing an aqueous solution of trisodium cyanurate, and chlorine in an amount at least equal to a slight excess but not substantially more than 100% molar excess of the stoichiometric amount necessary to replace the sodium atoms of said cyanurate with chlorine atoms, into a reaction zone to form a reaction mixture which is maintained at a temperature of about 10 to 35% C., said solution and chlorine being supplied at such a rate and with sufficient mechanical agitation to maintain the resulting reaction mixture at a pH between 2.5 and 4.3, thereby continuously forming an aqueous reaction mixture having the aforesaid pH and comprising a slurry of trichlorocyanuric acid, continuously removing a portion of trichlorocyanuric acid together with a portion of the aqueous phase of said reaction mixture from said reaction zone before material decomposition of said acid occurs and subsequently dewatering the trichlorocyanuric acid thus removed before the yield of trichlorocyanuric acid, based on the trisodium cyanurate employed, drops below 75% of theory.

7. A continuous process for preparing trichlorocyanuric acid which comprises continuously introducing an aqueous solution of trisodium cyanurate into a reaction zone, continuously introducing chlorine into said solution in said reaction zone in an amount at least equal to a slight excess but not substantially more than a 100% molar excess of the stoichiometric amount necessary to replace the sodium atoms of said cyanurate with chlorine atoms to form a reaction mixture which is maintained by cooling at a temperature of about 10 to 35° C., said trisodium cyanurate sodium and chlorine being supplied to said reaction zone at such a rate and with sufficient mechanical agitation to maintain said reaction mixture at a pH between about 3 and 4.2, thereby continuously forming an aqueous reaction mixture having the aforesaid pH and comprising a slurry of trichlorocyanuric acid, continuously removing a portion of trichlorocyanuric acid and a portion of the aqueous phase of said reaction mixture from the reaction zone and separating the trichlorocyanuric acid thus removed from the aqueous phase associated therewith until the trichlorocyanuric acid contains less than 25% by weight of moisture and before the yield of trichlorocyanuric acid, based on the trisodium cyanurate employed, drops below 75% of theory.

8. A continuous process of preparing trichlorocyanuric acid which comprises continuously introducing an aqueous solution of trisodium cyanurate into a reaction zone which is maintained at a temperature of about 10 to 25° C., continuously introducing gaseous chlorine into said solution in said reaction zone in an amount varying from slightly in excess of the quantity of chlorine required to produce trichlorocyanuric acid up to a 20% molar excess, continuously dispersing said chlorine through said solution to maintain the solution at a pH below 4.3, thereby forming an aqueous reaction mixture having a pH below 4.3 comprising a slurry of trichlorocyanuric acid, continuously removing trichlorocyanuric acid together with a portion of the aqueous phase of said mixture from said reaction zone before material decomposition of the trichlorocyanuric acid occurs, and separating the trichlorocyanuric acid thus removed from the bulk of the aqueous phase associated therewith before material decomposition of the trichlorocyanuric acid occurs.

9. A continuous process as in claim 8, but further characterized in that the trichlorocyanuric acid and the aqueous phase associated therewith is removed from the reaction zone at a rate sufficient to maintain the volume of aqueous reaction mixture in the reaction zone substantially constant.

References Cited in the file of this patent
UNITED STATES PATENTS 2,607,738    Hardy                 Aug. 19, 1952

FOREIGN PATENTS 565,256    Canada               Oct. 28, 1958

OTHER REFERENCES

Hands et al.: Journal of the Society of Chemical Industry, vol. 67, pp. 66–99 (1948).

Chattaway et al.: Journal of the Chemical Society, vol. 81, pp. 200 and 202 (1902).

Hantzsch: Journal of the Chemical Society, vol. 90, pp. 146–148 (1906).

UNITED STATES PATENT OFFICE
CERTIFICATION OF CORRECTION

Patent No. 2,964,525            December 13, 1960

William L. Robinson

It is hereby certified that error appears in the above numbered patent requiring correction and that the said Letters Patent should read as corrected below.

Column 5, lines 50 and 51, for "maintainer" read -- maintained --; column 10, line 48, for "which" re -- with --; column 11, line 41, for "35% C." read -- . --; column 12, line 6, for "sodium" read -- solution --.

Signed and sealed this 4th day of July 1961.

(SEAL)
Attest:

ERNEST W. SWIDER            DAVID L. LADD
Attesting Officer            Commissioner of Patents